United States Patent
Lepain et al.

[11] Patent Number: 6,108,072
[45] Date of Patent: *Aug. 22, 2000

[54] PROTECTION FOR OPTICAL SENSORS IN INDUSTRIAL APPLICATIONS

[76] Inventors: Chris Lepain; Ralph Rebner, both of 6360 Hawthorne Dr., Windsor, Ontario, Canada, N8T 1J9

[*] Notice: This patent is subject to a terminal disclaimer.

[21] Appl. No.: 09/201,669

[22] Filed: Dec. 1, 1998

Related U.S. Application Data

[63] Continuation of application No. 08/704,334, Aug. 28, 1996, Pat. No. 5,844,668.

[51] Int. Cl.[7] .................................................. G01J 5/48
[52] U.S. Cl. ........................... 356/43; 356/438; 356/439
[58] Field of Search ............................... 356/43, 438, 439

[56] References Cited

U.S. PATENT DOCUMENTS

| | | |
|---|---|---|
| 5,042,821 | 8/1991 | Bontly . |
| 5,083,865 | 1/1992 | Kinney et al. . |
| 5,146,244 | 9/1992 | Myhre et al. . |
| 5,161,055 | 11/1992 | Blechschmidt . |
| 5,175,717 | 12/1992 | Saimi et al. . |
| 5,184,225 | 2/1993 | Mitani et al. . |
| 5,442,155 | 8/1995 | Nihei et al. . |
| 5,448,362 | 9/1995 | Perchak . |
| 5,548,393 | 8/1996 | Nozawa et al. . |
| 5,563,737 | 10/1996 | Kamrat . |
| 5,599,105 | 2/1997 | Ridley et al. . |
| 5,608,515 | 3/1997 | Shu et al. . |
| 5,612,785 | 3/1997 | Boillot et al. . |
| 5,844,668 | 12/1998 | Lepan et al. ........................ 356/43 |

FOREIGN PATENT DOCUMENTS

PCT/US94/00398  1/1994  WIPO .

*Primary Examiner*—Robert H. Kim
*Attorney, Agent, or Firm*—Larson & Taylor plc

[57] ABSTRACT

This invention describes method and apparatus for protecting optical sensors in harsh industrial environments, particularly welding and machining. In a preferred embodiment, a sacrificial window is utilized which is replaced as needed. Numerous design features of such windows are disclosed. Other embodiments include protective baffles and other features.

17 Claims, 5 Drawing Sheets

PROTECTION FOR OPTICAL SENSORS IN INDUSTRIAL APPLICATIONS

This is a continuation of Ser. No. 08/704,334 filed on Aug. 28, 1996 now a U.S. Pat. No. 5,844,668.

INTRODUCTION

In the development of electro-optical sensors for use in assembly tools and other applications, protection is required where welding or other environmental contamination is taking place. Some approaches to this problem have been described in co-owned pat. Appl. PCT/US94/00398, incorporated by reference, and in co-pending application Ser. No. 08/704,861, filed on even date by Timothy R. Pryor, for FURTHER PROTECTION FOR OPTICAL SENSORS IN INDUSTRIAL APPLICATIONS.

This application is aimed at further protection means, which can be desirable in many applications. The development here has been developed through testing in several automotive factory applications in both spot welding and arc welding, although the invention comprehends protection from a wide variety of other contamination sources.

BACKGROUND

Machine vision and electro-optical sensors are extremely useful for rapid accurate data gathering from objects, such as parts being manufactured. The ability of such sensors to be employed is however, limited by their ability to work in the manufacturing or other environment in question. While problems of EMI, liquids, etc. can generally be solved, the more severe environments cause degradation of the optical components of the sensor-particularly the front protective window.

There are two kinds of such contamination. The first are those contaminants with locally impact or react with the window to adversely alter its optical characteristics or eventually destroy it. The second are those which coat the window, seldom destroying it, but generally reducing optical performance over a larger window region.

An example of the former, which has been encountered by the inventors where optical sensors are used in car body and other fabricated parts assembly, is window contamination by weld splatter, or drips. During welding, particles of metal, the temperature of which depends on the process, are shot off, or fall onto the sensor window—melting, crazing, staining, or otherwise damaging it. The particular problem is damage to the front window of the sensor which protect the basic optics inside. These windows are typically assumed to be flat and clear, and departures from this condition due to contamination or damage, can change the characteristics of the sensor, or kill its operation completely, depending on the optical design.

METHODS OF PROTECTION

There are several methods of protection. The first is to keep contamination from falling on the window at all. In this case, shutters and baffles can be used, and some variations of this are described herein.

The second mode of protection is to have an external window, such as shown in FIG. 1 of this case. This external window is, in a preferred embodiment, is essentially sacrificial, and when it is damaged enough to where the sensor won't work sufficiently to get accurate information from the parts, or other characteristics being observed, this window is replaced.

The way in which the external window interacts with the optical sensor, the choice of material, the methods for attaching it to the sensor, the specifics of its particular location, and other features, are all here described. Other forms of protection are also disclosed such as specialized covers, magnetic repulsion, and other means.

The invention is more particularly disclosed in the following embodiments.

Figure 5:
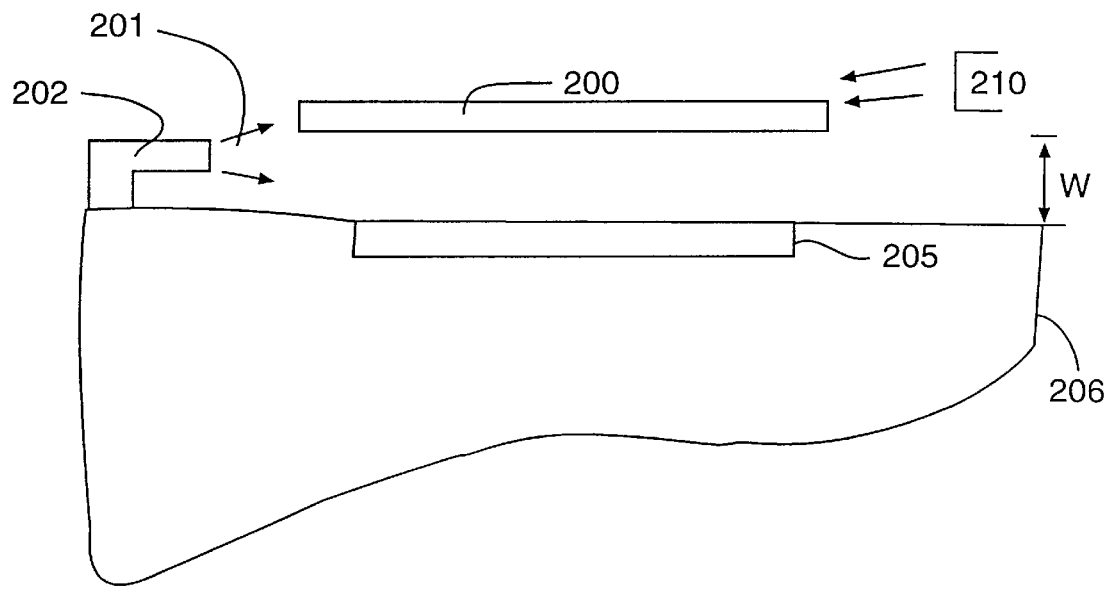
FIG. 5 is a diagrammatic view of a third embodiment of the invention where a protective window is spaced from a window of an optical sensor.
Figure 6:
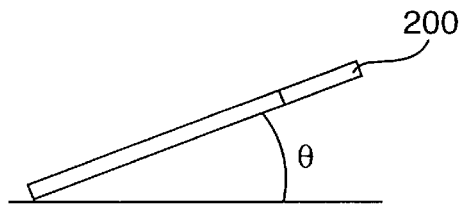
Figure 6:
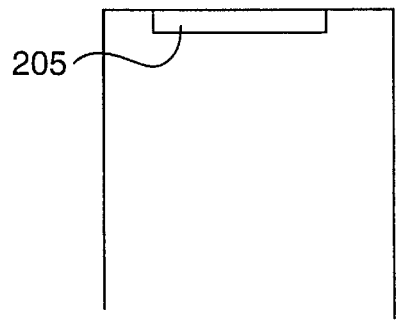

FIG. 6 diagrammatic illustration of a modification of an element of the device of FIG. 5.

Figure 7:
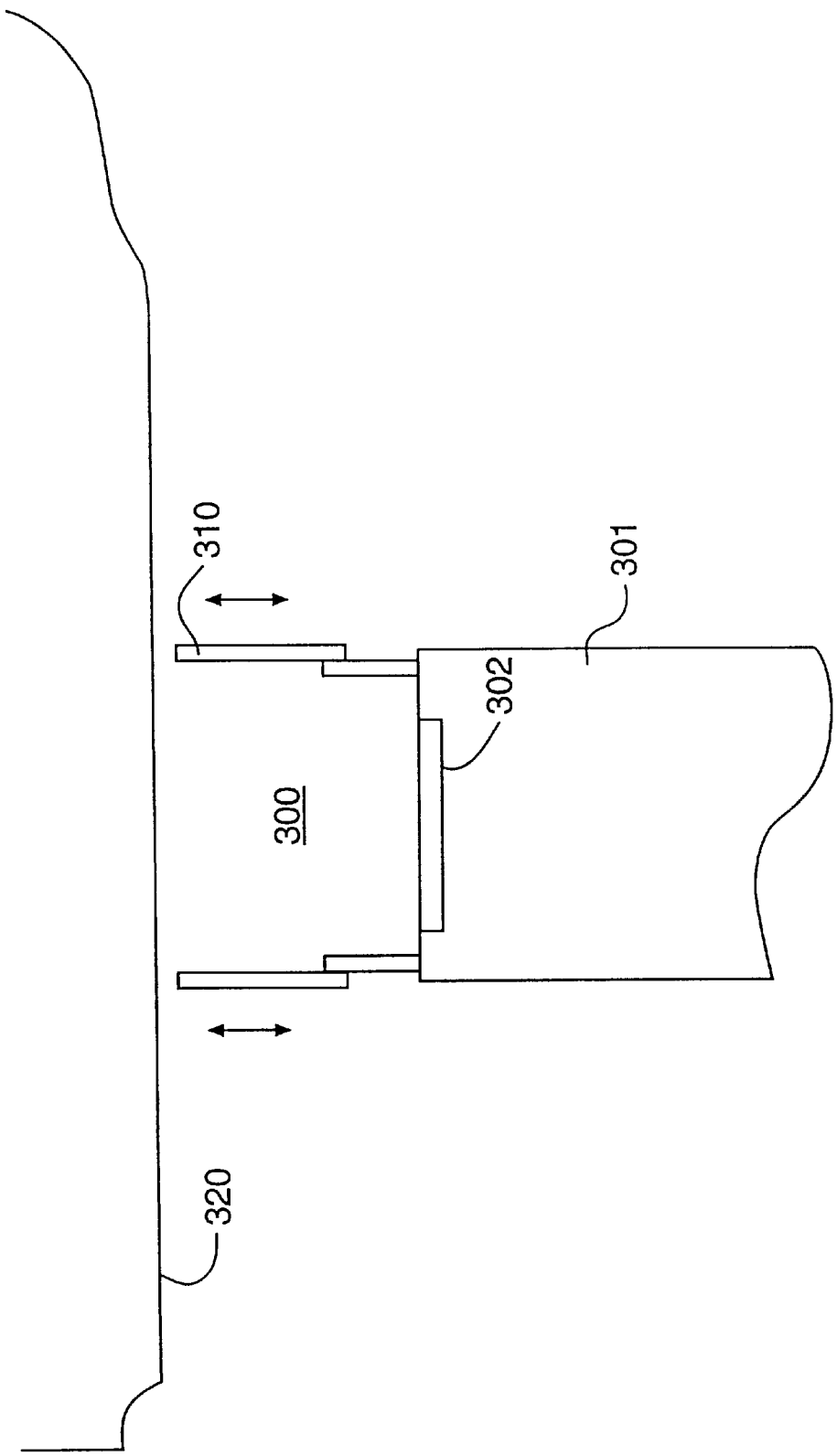

FIG. 7 illustrates other means of protection of the sensor.

Figure 8:
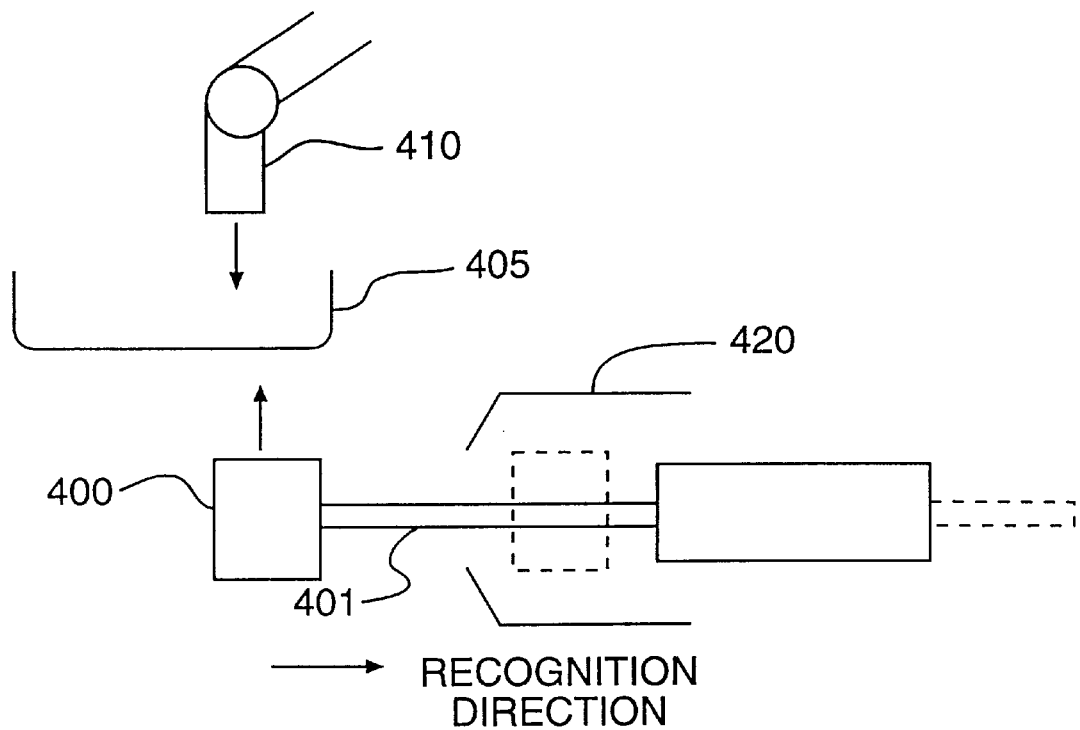

FIG. 8 illustrates a sensor having a collapsible protection device, which is compressed by the part being welded to shield the sensor during welding from splatter in adjacent areas.

Figure 9:
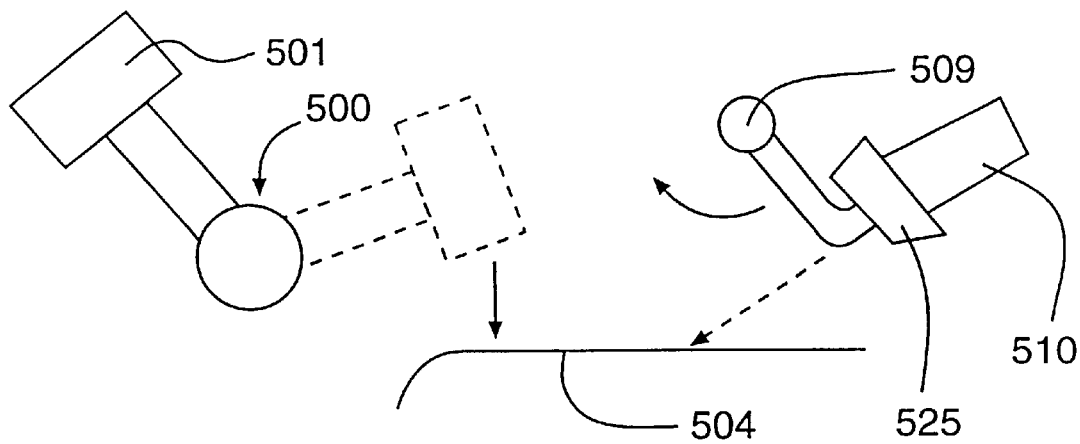

FIG. 9 illustrates an indexable shutter using a shuttle type mechanism and an indexable shutter using a lever action.

Figure 1:
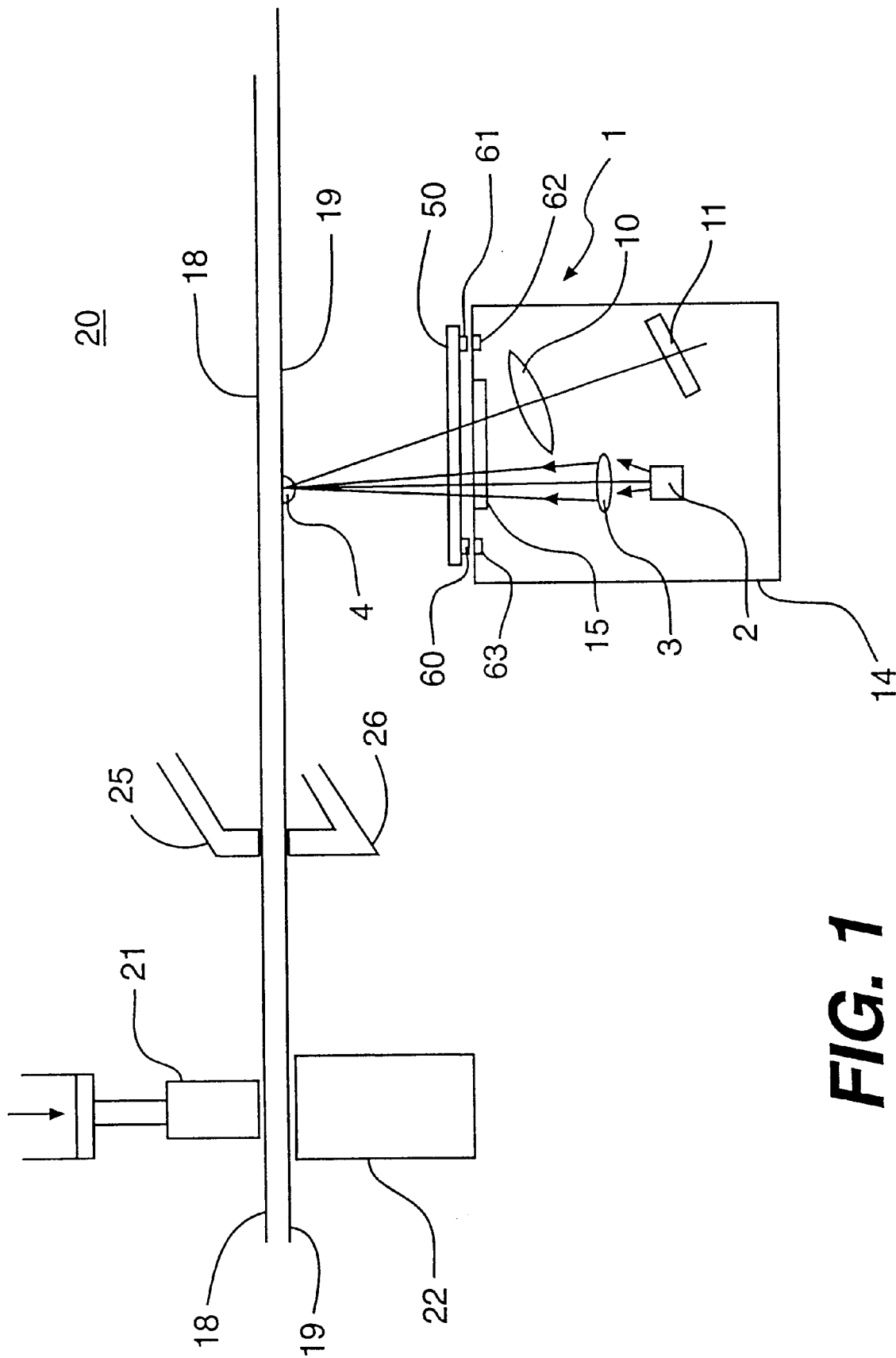
FIG. 1 is a diagrammatic view of a first embodiment of a sacrificial external window of the invention and its mounting to a typical triangulating sensor.
Figure 2:
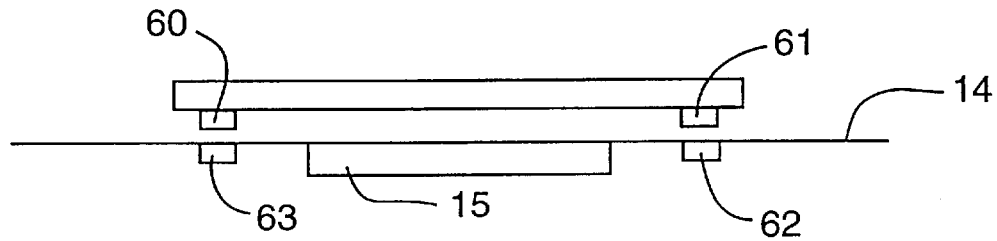
FIGS. 2 and 3 are diagrammatic illustrations of a portion of the device of FIG. 1.
Figure 3:
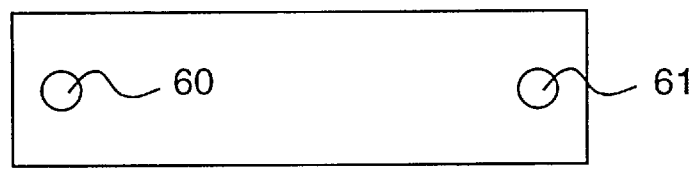
Figure 4:
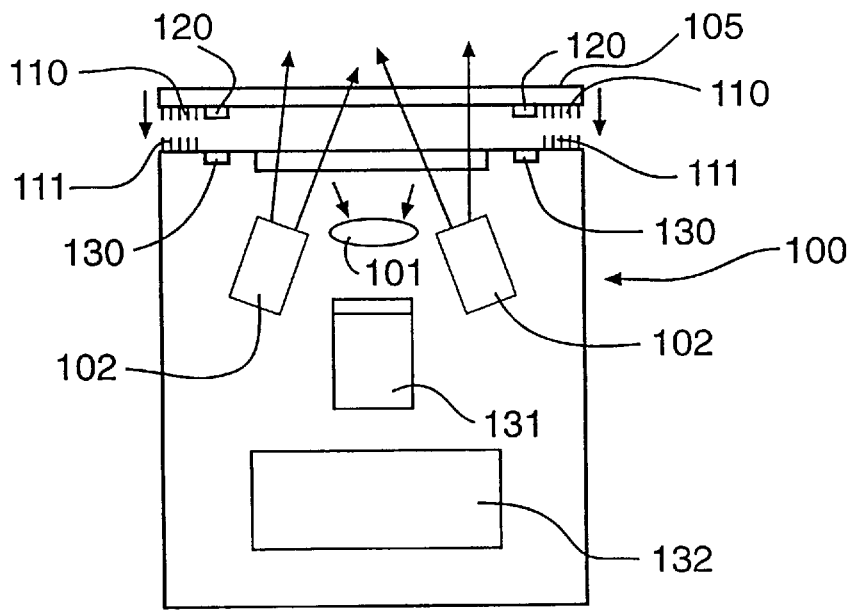
FIG. 4 is a diagrammatic view of a second embodiment of a sacrificial external window of the invention, and its mounting to a typical image analyzing sensor.

FIG. 1 illustrates the basic invention. An electro-optical sensor, typically having lighting, imaging, and detection elements within a housing is in this case represented by a triangulating optical sensor 1, having a visible light laser diode 2, whose beam is converged by lens 3, onto a zone 4 on the surface of an object 19 such as a sheet metal part. Imaging lens 10, images light from the illuminated zone onto an image position sensing detector, such as photo detector array 11. All components of the sensor are typically within a single housing, 14. Contained as well within the housing, and often flush with its outer surface is a sensor window 15, which protects the elements within.

The invention herein comprehends an additional protection over and above that provided by the base sensor window. This protection is particularly that of a sacrificial window, which can be replaced by the user as required.

Typically this sensor 1, is located within a welding assembly tool, such as 20, a section of which is here shown. In this section, two pieces of sheet metal 18 and 19 are clamped together by clamp 21, against a locator block 22, and a spot weld gun, having two tips, 25 & 26, is used to both urge the metal together, and to put a large current through the metal, causing it to locally melt and thus fuse together, producing a "spot weld".

When such spot welding occurs, typically under currents as high as 60,000 amperes, if the tips are not well prepared and aligned, sparks are generated comprised of tiny bits of molten metal, which fly out in all directions.

As discussed in the referenced co-pending applications, a sacrificial window such as 50 can be placed to absorb or deflect such splatter, preventing it from hitting the window of the sensor unit, 15, possibly penetrating same, and destroying the device, or at a minimum generally, altering its performance in a deleterious manner. The sensor unit can thus be protected with the sacrificial window replaced as necessary.

We have found in practicing this invention that the ease of replacement of the window in its proper location is essential for customer acceptance. Replacement is after all an added maintenance operation of the welding line, and not taken lightly by the plant personnel. For this reason special types of window mounting arrangements have been developed, here disclosed.

As shown, the window 50 has two round magnetic portions, 60 & 61, which in turn are attracted to the magnetic portions of the housing, 63 & 62. While all of the above, elements 60–63 can be magnets, generally only one of the two opposing faces needs itself be magnetic, the other being ferrous or other suitable material. However typically, both are magnetic, as many of the sensor housings used are aluminum, or in some cases plastics, and thus do not provide a suitable material surface. Note that more or less magnets can be used, with the choice generally being the minimum number suitable to sufficiently secure the window in question.

A key part of this invention, besides the ease of the magnetic snap-on/snap-off characteristic of this window, is that the round magnets utilized are self-aligning. As the operator places the window in position, it "snaps" into correct alignment. Alternative means of alignment are also possible, such as tapered pins.

Note that round magnets 62 and 63 can, if desired be recessed slightly in the front of housing 14, such that opposite pole magnets 60 and 61 on the window 50 can fit into the recess so as to better align the window. Alternatively, but less preferred, magnets 62 and 63 could protrude, and fit into recesses in window 50.

While perfect alignment is not necessarily required, it should be noted that many electro-optical sensors, such as the triangulating ones described above, have been developed to measure highly accurately over significant ranges, using essentially the optical deviation of visible or infrared images. Since the window is a refractive element, if it is out of position it can disturb the calibration of the sensor.

The sacrificial window is preferably thin, and flat, so that it does not significantly disturb the calibration by extending the image distance or warping the optical axis, for example. It is desirably close to the sensor window, and, in turn, preferably to the imaging lens as well, itself often located near the sensor window inside the housing.

A preferable sacrificial window is 1 mm or less in thickness, located within 1mm of the sensor window. However, it can be noted that such windows, when thicker, are desirably more difficult to melt through, although optical distortion even in the surface can shut the sensor down in certain cases, without total destruction of the window.

We have found in practicing the invention with imaging type sensors located in welding tools, that the sacrificial window is preferably within 40 mm from the imaging optics. A sacrificial window material we have found useful is acrylic plastic.

FIG. 1b shows a sheet metal hole or other image analyzing sensor, 100, including imaging lens 101, matrix array camera 131 connected to computer 132, and part illuminating lights, 102, where the lights are also covered by the sacrificial window, 105, in this case attached by "velcro" (or other suitable hook and eye or other type material) strips 110 and 111, to housing 100, and if desired, aligned in this case using tapered pins 120 in housing hole 130.

Less desirably, multiple sacrificial windows can be used on different portions of a sensor, where imaging and transmitting optics are for example widely spaced. This makes more effort for maintenance personal, as more changing operations are involved.

FIG. 5 illustrates a sacrificial window, 200, or for that matter a permanent window (if it can withstand the environment), spaced with an air gap of width, W, with respect to the front window, 205, of sensor housing, 206—in this case of a triangulation ranging type optical sensor, or other type optical sensor.

As noted above, it is desirable for sensor calibration purposes that "W" be minimized. However, in very adverse environments, it may be desired to space the sacrificial window a larger distance W, in order that weld splatter, or other material, melting through or otherwise penetrating the sacrificial window does reach the window of the housing. To further encourage this to be the case, air flow 201 from jet 202, in this case attached to the sensor housing, is directed across the back side of the window, through the air gap, W. This tends to cool the window 200 (and 205 as well) and prevent it from melting.

As shown in FIG. 6, the protective window 200 can also be tilted at an angle, theta, with respect to the sensor window 205 (inset) in order that molten material can be deflected off, and/or fall off, without hitting window 205.

In a further system for an even more hazardous environments, air blow 201 is forced over the front of the sacrificial window in order to urge undesirable material to fall off, as opposed to stick, and further to cool the material and window even more, postponing the point at which melting the window occurs (and the window has to be replaced).

With such air blow type systems, it is generally important that dry air be used, or another dry gas, such that moisture from the blow-off action (often present if compressed air traveling through shop floor lines is used) does not itself contaminate the window.

FIG. 7 illustrates other means of protection of the sensor in operation. In this particular figure, the sensor beam path 300 of triangulating sensor 301 with output window 302 is essentially enclosed, by spring loaded collapsing metallic tube 310. Alternatively an elastic rubber "boot" may be used instead of a tube.

As the part 320 to be welded is loaded into the welding station (not shown for clarity), it is loaded over the telescoping tube 310, compressing it and leaving no air space for the weld splatter to enter. This works for sensors whose optical axis is generally in the direction of part load, unload (usually vertical, but not always).

If the parts cannot be loaded in such a manner, slides can be provided to index the collapsing tube or other baffle in order to partly or fully enclose the beam path. Or shutter mechanisms can be employed by placing a protective metallic plate in front of the output window 302 of the sensor.

An alternative method is illustrated in FIG. 8 in which the sensor 400 is located on a slide or other suitable conveyance, 401, and moved in and out of position, with respect to the object to be measured 405, which itself may be welded by MIG weld torch 410, for example. When sensor 400 is out of position (dotted lines) it can be covered over, for example by housing 420, in such a way as to out of the danger of the weld splatter during welding (the sensing being used only before and after welding).

Another approach, illustrated in FIG. 9, includes a programmable lever unit 500 that flips a sensor 501 into position relative to part to be measured 504, and then removes it from harm's way.

A rotary lever unit such as 509, can alternatively be used to move, on command, a shuttering device into position.

This is shown wherein another sensor 510 also used to determine location of part 504, has a blocking hat 525 placed over it during welding by rotary unit 509. Such techniques can be used to protect against machining coolants and the like during machining, and for shielding sensors during other working.

Note that it is also possible to have a window material which can incorporate metallic or magnetic material properties into the glass, plastic or other window material, such that the window itself can be magnetically or otherwise attracted to the sensor housing. For example small permanent magnets 65 and 66 may be positioned in the housing.

In this invention, the terms optical sensor, and light, include all electromagnetic wavelengths, ultraviolet to infrared inclusive.

What is claimed is:

1. In a method of sensing with an optical sensor an object in an environment which is capable of periodically generating contamination which interferes with said sensing, the improvement which comprises:
   (a) providing a housing for said sensor, said housing being mounted in a location subject to said contamination and being constructed and arranged to shield from said contamination a sensor located in a housed position in said housing;
   (b) providing means for moving said sensor from said housed position to a sensing position for sensing an object, said sensing position being subject to said contamination;
   (c) actuating said sensor moving means, to move said sensor from its housed position to its sensing position;
   (d) actuating said sensor in said sensing position to sense an object; and
   (e) actuating said sensor moving means to move said sensor from its sensing position to its housed position; steps (c), (d) and (e) being effected at a time that said contamination is not being generated.

2. A method according to claim 1 wherein said sensor comprises an electro-optical sensor.

3. A method according to claim 1 wherein said environment is a welding or machining environment.

4. A method according to claim 1 wherein said contamination comprises weld spatter.

5. A method according to claim 1 wherein said contamination comprises oil.

6. In apparatus for sensing with an optical sensor an object in equipment capable of periodically generating contamination which interferes with said sensing, the improvement which comprises:
   (a) a housing for said sensor, said housing being mounted in a location subject to said contamination and being constructed and arranged to shield from said contamination a sensor located in a housed position in said housing;
   (b) means for moving said sensor from said housed position to a sensing position for sensing an object, said sensing position being subject to said contamination and for moving said sensor from said sensing position to said housing position; and
   (c) means for actuating said sensor in said sensing position to sense an object.

7. Apparatus according to claim 6 wherein said sensor comprises an electro-optical sensor.

8. Apparatus according to claim 6 wherein said equipment comprises welding equipment.

9. Apparatus according to claim 6 wherein said equipment comprises machining equipment.

10. In a method of sensing with an optical sensor an object in an environment capable of generating contamination which interferes with said sensing, the improvement which comprises:

providing an optical sensor in an object sensing position, said sensing position being subject to said contamination, said optical sensor having, in use, an optical path extending between said sensor and an object being sensed, said sensor including a compressible shielding member surrounding said optical path;

positioning said sensor relative to an object such that the shielding member is compressed between the sensor and the object sufficiently to shield the sensor from said contamination; and actuating said sensor to sense said object while said contamination is present and while said sensor is shielded by said compressed shielding member.

11. A method according to claim 10 wherein said environment comprises assembly tooling or machining equipment.

12. A method according to claim 10 wherein said sensor comprises an electro-optical sensor.

13. A method according to claim 10 wherein said compressible member comprises a collapsible tube mounted on said sensor.

14. In an apparatus for sensing with an optical sensor an object in equipment capable of generating contamination which interferes with said sensing, the improvement which comprises:

an optical sensor in an object sensing position which is subject to said contamination, said optical sensor having, in use, an optical path extending between said sensor and an object being sensed;

a compressible shielding member on said sensor and surrounding said optical path;

said sensor being positioned relative to an object positioned in said component such that the shielding member is compressed between the sensor and the object sufficiently to shield the sensor from said contamination; and means for actuating said sensor to sense said object while said contamination is present.

15. Apparatus according to claim 14 wherein said equipment comprises assembly tooling or machining equipment.

16. Apparatus according to claim 14 wherein said equipment comprises welding equipment and wherein said contamination comprises weld spatter.

17. Apparatus according to claim 14 wherein said compressible member comprises a collapsible tube mounted on said sensor.

* * * * *